(12) United States Patent
Gillis

(10) Patent No.: US 11,449,521 B2
(45) Date of Patent: Sep. 20, 2022

(54) DATABASE MANAGEMENT SYSTEM

(71) Applicant: TrendMiner N.V., Hasselt (BE)

(72) Inventor: Joris Gillis, Hasselt (BE)

(73) Assignee: TrendMiner N.V., Hasselt (BE)

( * ) Notice: Subject to any disclaimer, the term of this patent is extended or adjusted under 35 U.S.C. 154(b) by 0 days.

(21) Appl. No.: 17/131,228

(22) Filed: Dec. 22, 2020

(65) Prior Publication Data
US 2022/0197904 A1   Jun. 23, 2022

(51) Int. Cl.
G06F 16/2458 (2019.01)
G06F 16/28 (2019.01)
G06F 16/248 (2019.01)
G06F 16/2455 (2019.01)

(52) U.S. Cl.
CPC ........ G06F 16/2477 (2019.01); G06F 16/248 (2019.01); G06F 16/2455 (2019.01); G06F 16/283 (2019.01)

(58) Field of Classification Search
CPC ............. G06F 16/2477; G06F 16/2455; G06F 16/283; G06F 16/248
USPC ....................................... 707/718
See application file for complete search history.

(56) References Cited

U.S. PATENT DOCUMENTS

| | | | |
|---|---|---|---|
| 7,743,275 B1 | 6/2010 | Tormasov et al. | |
| 2016/0092484 A1* | 3/2016 | Finkler | G06F 16/258 |
| | | | 707/715 |
| 2017/0102678 A1* | 4/2017 | Nixon | G05B 17/02 |
| 2017/0102694 A1* | 4/2017 | Enver | G05B 19/4184 |
| 2017/0102696 A1* | 4/2017 | Bell | G05B 23/024 |
| 2017/0103103 A1* | 4/2017 | Nixon | G06F 16/2452 |
| 2019/0146849 A1* | 5/2019 | Leonard | G06F 9/5083 |
| | | | 718/104 |

FOREIGN PATENT DOCUMENTS

| | | |
|---|---|---|
| JP | 2003132088 A1 | 9/2003 |
| WO | 2018/157145 A1 | 8/2018 |

OTHER PUBLICATIONS

"Apache Cassandra," Wikipedia.
"InfluxDB," Wikipedia.

* cited by examiner

*Primary Examiner* — Dung K Chau

(74) *Attorney, Agent, or Firm* — 24IP Law Group USA, PLLC; Timothy R DeWitt

(57) ABSTRACT

A database management system and a method for redundant storage of time-series data in a distributed data storage system with a plurality of storage media is disclosed. The method comprises dividing the time-series data into a plurality of data blocks, storing the plurality of data blocks on ones of the plurality of storage media, and redundantly storing a subset of time series data, which is contiguous in time to one of the plurality of data blocks, on the same one of the plurality of storage media as the contiguous one of the plurality of data blocks.

18 Claims, 9 Drawing Sheets

DATABASE MANAGEMENT SYSTEM

CROSS REFERENCE TO RELATED APPLICATIONS

None

BACKGROUND OF THE INVENTION

Field of the Invention

The invention relates to a time series database management system.

Brief Description of the Related Art

A time series database (TSDB) is a software system that is used for storing a time series of data points with associated pairs of time(s) and values. The time series is an ordered sequence of timestamped values and the data points stored in the databases are usually ordered according to their timestamp. Examples of sources which store such data points time series databases include a weather station emitting temperature readings at regular intervals or production equipment in a factor environment with a plurality of sensors monitoring manufacturing data.

Time series are essentially "infinite" with new data arriving and being stored in a storage medium continuously. A further property of time series data is that time puts a natural order to the stored data points and so is used in querying the time series data. As a result, the storage mechanism for time series data in the memory should exploit the natural ordering for reading and querying the time series data.

On any type of data there are typically three levels of querying. In the first level of querying, there is an interest in obtaining the value of particular data points in specific data records. For example, fetching the temperature readings of a particular weather station in the last hour. This level of querying defines a very precise definition of the data that needs to be retrieved by the database system. In general, the amount of returned data is very small compared to all of the data stored in the database.

In the second level of querying, instead of retrieving the specific data records, there is an interest in getting insights in the data. This second level of query includes basic analytical queries. For example, what was the average temperature in spring over the last 10 years, per weather station in a certain geographic region. This level of querying involves filtering the data items (only weather stations in a certain region; only spring), grouping of the data items (per weather station) and aggregating the values of one or more of the data points (average temperature).

Finally, the third stage of querying is about advanced analytical capabilities. For example, providing a forecast on the temperature for today using the historic values in the database. This typically involves querying multiple time series over multiple time periods. It is good practice not to use the queries on outdated data, but it is acceptable to have a short delay between the production of a data point and its availability in the database for querying. These advanced analytics queries take advantage of large, historical data volumes and hence missing a little bit of the most recent data does not have an impact on the overall result.

Current time series databases can handle first level and second level queries efficiently. The analytical queries of the third level require more advanced storage methods to be computed efficiently.

To compute the answer to a query, the time series database (TSDB) needs to access data on a persisted storage medium. The type of data, the order and the combination of the data required at any given point in a computation is called the data access pattern. Partitioning of the data in a cluster of computers is a key performance factor in such database querying systems. Let us suppose that a first computer A needs to compute a query using the data and the data resides on a second computer B. The first computer A needs to request the data from the second computer B. This incurs a potential disk read (if the data is not cached in memory) of the data on the second computer B and a network transfer of the data from the second computer B to the first computer A. Such a data fetch will be a lot slower than processing the data that is in-memory (i.e., on a storage medium) on the first computer A. Consequently, the data partitioning in a cluster needs to be aligned with the data access pattern of its processes.

In a time series there are two logical dimensions to partition data: (1) time series (identifiers) and (2) time. To illustrate, a data partitioning is assumed in which data is partitioned into chunks per time series, per logical time unit (e.g., day). This is shown in FIG. 1 in which four time series are shown. Each of the times series is partitioned into a time unit shown by the blocks in FIG. 1A.

Suppose that a first level query is made. This first level query specifies a single time series and a specific time range. The data access pattern consists of one or more chunks as shown in FIG. 1 for the time series 2.

FIG. 2 shows the access pattern of a second level query. For example, the query requires aggregating the data in the greyed region of time series 1. Typically, a single time series is requested, but more chunks of data are accessed than in the first level query shown in FIG. 1. It will be noted that for some types of queries, e.g., sliding windows, the data from two chunks is needed. Hence both of the chunks of data need to be accessible simultaneously for the processor.

FIG. 3 shows a potential data access pattern for an advanced analytics query at the third level. It will be assumed that the third level query will access multiple time series, across different, non-aligned time periods.

One example of a third level query is a Vector Autoregressive (VAR) model which captures linear interdependencies between a set of time series with time lags. The VAR model is used to make predictions about the values of a time series X, given the historical values of X and a set of independent time series Y. Such a VAR model is particularly useful when building derived time series that cannot be observed by sensors. An alternate use is for anomaly detection; if the actual time series deviates from the derived predictive time series, something new or out of the ordinary is happening.

FIG. 4 shows an example of the VAR model. A square with + sign indicates a positive dependency and a square with a negative sign indicates a negative dependency. To predict future values of the time series 4 (X), a combination of values is taken from the time series 1, 2 and 4. Not all of these values are at the same (relative) time. When computing a time range for time series 4, non-aligned time ranges are required from time series 1, 2 and 4.

A data partitioning system maps a time series identifier (in FIGS. 1-4 these are labelled 1, 2, 3, and 4 for simplicity) and a time range to (1) a set of chunks of data, and (2) provides a location in the cluster for each of the chunks of data. There are many implementation options for such a system. Each implementation is a trade-off and must take many problem dimensions into account.

On the hardware level are the cluster and computer properties. Each computer has a finite amount of memory, disk space and processors, and a finite bandwidth between those components. The network, interconnecting the computers in the cluster, provides a finite bandwidth, translating to a finite amount of data that can be transferred in any given time.

On the data level, there is the cardinality of time series (how many time series?), the frequency of the data (how many data points arrive per second/minute?), and in many cases there is some hierarchy or grouping on the time series (which time series will be used together?). These properties differ greatly between applications; hence it is not possible to make any assumptions on them.

On the query or application level, we have the properties cardinality (how many time series?), the lag (how far back in history are values used?), and time window (how big of a window is queried?). Like the data level, it is hard to make any assumptions. it would be expected that frequency is inversely correlated with time lag: the higher the frequency (=more data), the shorter the time lag in principle. For example, the air temperature doesn't change very rapidly, hence a longer time lag is expected. A temperature sensor in, for example, a race car will have a higher frequency, and its value will likely not be influenced by something that happened hours ago.

These properties are generally not known when starting the database system and the properties can also change while the system is in operation. A data partitioning system should be able to auto optimize and adapt on the fly based on observed values for these properties.

A number of time series database systems are known in the art. For example, Apache Cassandra is a general-purpose NoSQL (key value) data store which is able to store time series. The data store employs a Log-Structured-Merge (LSM) tree. In a nutshell, the LSM tree collects all incoming data in an in-memory table (MemTable) for fast writes. Once full, a MemTable is flushed to disk as a Sorted String Table (SSTable). A SSTable is sorted by time series identifier and timestamp. A compaction strategy merges SSTables into new SSTables. Each compaction improves the read performance, because the bigger blocks after the compaction span longer time periods and thus fewer blocks need to be read by a query for the same amount of data.

The Apache Cassandra system uses a hash-partitioning scheme to spread the time series across the computers of a cluster. As a result, the different time series can be in different computers. An index structure is used to identify in which SSTables the data of the time series occurs. Each SSTable has an index to find the time series within the data file.

The query language in the Apache Casandra system has limited computational expressiveness. Its main goal is fetching data fast from a big amount of data.

Another known database system is InfluxDB which is a special-purpose time series database (TSDB) and has become popular for storing time series data. It uses a similar approach for storing time series data as Apache Cassandra: The Time-Structured-Merge (TSM) tree. A TSM stores incoming data in a MemTable. After flushing to disk, the data blocks are referred to as TSM files. Each TSM file represents a time range. Contrary to Apache Cassandra, as compaction progresses, InfluxDB purposely groups the data points per time series. Thus, minimizing the number files that need to be read to answer any query.

Each TSM file represents a specific time range. In an InfluxDB cluster a set of consecutive TSM files are grouped into so-called "shard groups". Like a TSM file a shard group represents a specific time range. Shard groups do not have overlapping time ranges. Each shard in a shard group is assigned to a computer. Like Cassandra, the time series are distributed across shards with a hash partitioning scheme. The shard group typically represents one day of data.

No index structure is needed to find the computers containing the required shards. An index structure is required to find a time series within a TSM file. As a result, an operation on two of the time series has a high chance that it needs to fetch data from different computers.

Another known TSDB is Timescale DB. This TSDB does not employ an LSM or TSM but commits the data directly to disk. Whereas the InfluxDB program maintains equal-size data blocks (size increases per level), the TimeScaleDB program has a hybrid length and size strategy. The data blocks, called chunks, are maximally a pre-specified, fixed time length and maximally a pre-specified size in bytes.

In a cluster, TimeScaleDB employs a time- and space partitioning: each time series is assigned to a computer, and on that computer, the data of all the assigned time series is split up according to the hybrid length-size strategy.

An index is needed to find the data node containing data for a given time series. Within a node, an index is needed to find the chunks in which the requested time period can be found. As a result, any operation on a single time series can be fully computed by a single computer. An operation on multiple time series, however, has a high chance of data transfer.

The issue of data placement is not new. In the Hadoop system, big tables or big volumes of data are spread across the computers in a cluster. For some operations, several ones of the data partitions need to be combined. In a regular Hadoop system, this implies copying data over the network to a single computer and then carrying out the computation. The CoHadoop program is a research system to overcome this limitation. By carefully placing partitions, all queries, in a pre-specified set, can be computed without data transfer. This approach differs from the here proposed solution, in that the administrator of the system must predefine an attribute on which the data is co-located. This works well for relational data, but it does not work for the time series database system, as time is the attribute for co-location. In the CoHadoop system, the use of the attribute "time" would result in all data being stored on a single computer, leaving all other computers in the cluster jobless.

The AMOEBA system partitions the data blocks based on the predicates in a set of queries. The idea is to minimize the number of partitions that need to be read to answer a single query. The system optimizes the partitioning as the new queries are coming in.

This system is different from our system, in that it is only about a single table, and it partitions data into blocks based on predicates on attributes. A time series has only one attribute, and the time dimension. AMOEBA would partition the time series into time partitions based on which time ranges are frequently requested. However, it would not co-locate overlapping time ranges of different time series (which is essential for level three advanced analytics queries).

In relational data there can be zero, one or more attributes in the table that define some order on the rows in the table. Such attributes can be exploited for grouping rows in partitions. Time series data on the other hand, always has one attribute defining order on the values of a time series: time.

This is also reflected in the queries posed to relational and time series databases. Whereas a relational query typically joins multiple tables on matching attributes, queries in the time series database manipulate time (e.g., lags, sliding windows, selection a specific time range, . . . ). It is hard to imagine a time series query that would not involve time.

The prevalence of time in time series database queries means that partitioning time series data is not trivial and cannot be seen as an extension of partitioning schemes on relational databases. Either this would degenerate in storing all data on a single computer, or no colocation at all. This would result in a time series database that is not distributed or that is inefficient due to all the data transfers over the network between the computers when computing query results.

As previously describe, the third level, advanced analytics queries on time series data, requires combining non-aligned time periods of a subset of time series in the database system.

The closest to this goal is TimeScaleDB which allows the user of the system to define on which property time series are (space) partitioned across the data nodes of a TimeScaleDB cluster. In many situations, this will be sufficient but not always. For example, if sensor data of multiple, geographically disparate factories are stored in TimeScaleDB, TimeScaleDB can be configured to group all of the data from the different sensors of a single factory in the same space partition. That is, assign the whole group of sensors to the same data node. If one can assume that there are no causal links between the two factories (or sensors in the two factories), then combining of the data from the sensor of the two factories is not necessary or will only lead to spurious correlations.

On the other hand, by defining the grouping of the time series beforehand, it is possible to exclude all use cases where this structure is not known, and the exact purpose of the time series database is to identify such causal relationships.

For example, when recording stock prices in a time series database, it is not necessarily clear which stocks have causal relationships.

For example, when monitoring a set of microservices (i.e., decoupled components in software) a microservice can have an unforeseen impact on other microservices. When searching for root causes of demand peaks or outages of one microservice, the data of other microservice might be very relevant.

Moreover, misconfiguring the property for space partitioning in TimeScaleDB can have a big impact on the scaling of TimeScaleDB. When a space partitioning property only has two distinct values (e.g., factory A and factory B), there can only be a maximum of two space partitions and hence only two data nodes.

SUMMARY OF THE INVENTION

This invention describes a database management system with a data partitioning system that can be used in a time series database to support level three, advanced analytics queries, while minimizing data transfer within a computer and within the cluster and maximizing query throughput. Minimizing data transfer in the database management system is important, as such advanced analytics queries compute over large time windows in the time series database, thus consuming a lot of data. There are many parameters involved in a data partitioning system. From hardware parameters (e.g., available memory), over data level (amount of data per time series) to application parameters (amount of time series in a single query, amount of historical data). Data and application parameters also change over time. The auto-optimizing data partitioning system will adjust the data partitioning and distribution of data over the cluster in response to said parameters to optimize query answer time.

In this document it is assumed that fetching data from disk is less expensive (in CPU wait time and use of database resources) than fetching in-memory cached data over the network. This principle is used to design a method for storage and access of the time time-series data in a distributed data storage system and to provide a database management system to manage the time-series data in the distributed data storage system.

This document discloses a method for redundant storage of the time-series data in the distributed data storage system with a plurality of storage media. The method comprises dividing the time-series data into a plurality of data blocks and then storing the plurality of data blocks on ones of the plurality of storage media. A subset of the time series data which is contiguous in time to one of the plurality of data blocks is stored on the same one of the plurality of storage media as the contiguous one of the plurality of data blocks. The subset of the time series data will generally be a redundant identical copy of one (or more) of the plurality of data blocks. The redundant copy will be used instead of the original time series data in carrying out many of the queries and this minimises the data transfer required between different ones of the storage media.

The data blocks are of the same size and are collated into zones of a fixed time period, such as an hour, day or week. In one aspect, all of the data blocks of a single one of the zones are stored on the same one of the plurality of storage media. Since many types of queries are carried out over a fixed time period corresponding to the time period of the zone, this enables the queries to access the data on a single one of the storage media.

Examples of the time-series data used in this document include, but are not limited to, production data collected from a plurality of sensors.

In a further aspect, the method comprises dynamically changing the size of one or more of the data blocks, the subset of the time series, or the zones based on at least one of executed queries or stored time-series data. This enables the sizes to be changed dynamically to improve the performance of the queries. The dynamic changing is carried out "on-the-fly" without rebooting the database management system or interrupting the execution of the queries. Similarly, it is possible to change storage location of the time-series data after changing the size of at least one of the data blocks, the subset of the time series data, or the zones.

This document also teaches a method for accessing required time-series data from a distributed data storage system with a plurality of memory elements. The method comprises executing a query requiring access to the time-series data, selecting the data blocks with the required time-series data and identifying the ones of the plurality of storage media on which the selected ones of the data blocks are stored. The identified ones of the plurality of storage media are accessed to retrieve the selected ones of the data blocks and also to retrieve a subset of the time series data, which is contiguous in time, to the retrieved data block from the same one of the plurality of memory elements.

The method for executing of the query further comprises dividing the query into a plurality of sub-queries for transmission to different ones of the plurality of storage media for selection of the required time-series data.

A database management system is also disclosed. The database management system comprises a plurality of storage media for storing time-series data in a plurality of data blocks, a processor connected to the plurality of storage media through a network, and a local storage medium connected to the processor. The local storage medium stores at least one of the plurality of data blocks for accessing by the processor and redundantly stores a subset of time series data, which is contiguous in time to the stored one of the plurality of data blocks on the local storage medium. In one aspect, the data partitioning system further comprises a query executor for executing a query and transmitting sub-queries to different ones of the plurality of storage media in the network.

The data base management system may also comprise a statistics collector for processing statistics about data accessed by executed queries and adjusting the sizes of at least one of the data blocks, the subset of time series or the zones.

The document teaches the use of blocks and zones to decouple technical limitations and how time series data is read by an advanced analytics query. The size of the block has to take into account the available memory, the overhead of creating too small blocks and creating small enough blocks for increasing parallelism in the system. These are technical consideration a database system has to weigh.

On the other hand, advanced analytics queries typically operate on large time periods, different time series and lags (meaning the time periods are non-aligned between time series). By putting blocks in zones, and co-locating blocks and zones on time rather than time series id, the query can operate on large time periods with all data being local to the computer carrying out the computations.

This is in contrast to the prior art systems that put the whole history of a time series on a single computer. The prior art computers achieve distribution by allocating different time series to different computers. Thus, queries involving multiple time series need to transfer data between the computers to be able to compute the answer to a query. These data transfers will occupy the network and impair performance.

The partitions in the database management system are based on time and as a result there are time periods that span one or more of the zones. At the edges of the zones the data of the abutting zone is not locally available. This document discloses the concept of boundary copies in which some of the data blocks are copied from one zone to the next zone. By copying those data blocks and exploiting the structure (in the time dimension) of the data, even at the edges of a zone all data for non-aligned time periods is locally available. This reduces the need for network transfers while executing advanced analytics queries.

In contrast thereto, the prior art data base management systems co-locate based on time series id. The whole history of a time series is available to the query but may be spread over several storage media in the network. Thus, combining data from time periods of different time series incurs network transfers.

The size of the blocks, the zones and boundary copies can be changed while the database management system is running and depends on hardware parameters and functional parameters (i.e., the queries). This dynamic changing of the size improves the performance on the observed query workload. The prior art systems either have a fixed parameter configuration and cannot adapt to changing workloads or cluster configurations. Other ones of prior art systems can adapt online, but only in the context of relational/tabular data.

The document also discloses the concept of a hierarchical grouping. In some cases, it makes little sense to allow any time series in the system to be compared with any other time series. If a hierarchical grouping is of the time series is available this can be used to co-locate only those time series. That is, the allocation of the zones of a group of time series will not align with the allocation of the zones of another group to the computers in the network. The processing load can be spread even better across the computers in the cluster.

In the prior art, such as the TimeScaleDB program, the administrator can select, up front, one attribute to group time series. However, the cardinality of this attribute is the upper limit on the number of computers in the cluster. In the database management system of this document, the partitioning is based on time, and the grouping only limits the distribution of the current zone over the computers in the cluster. A new zone will be backed by a different computer, hence switching the load to different computers in the cluster. Furthermore, in TimeScaleDB this configuration has to be done by the administrator, otherwise queries will incur network transfers. In the database management system of this document, there will be no network transfer, with or without the grouping configured. Configuring the group does offer a performance optimization but is not necessary for the system to perform well (without network transfers).

DESCRIPTION OF THE FIGURES

For a more complete understanding of the present invention and the advantages thereof, reference is now made to the following description and the accompanying drawings, in which.

DETAILED DESCRIPTION OF THE INVENTION

Figure 1:
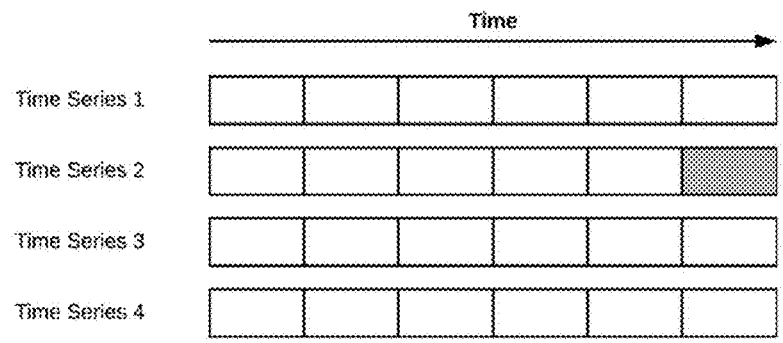
FIG. 1 shows an example of a first level query in a time series database.
Figure 2:
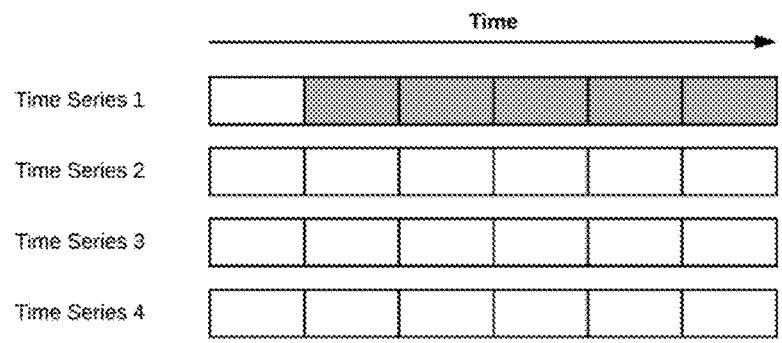
FIG. 2 shows an example of a second level query in a time series database.
Figure 3:
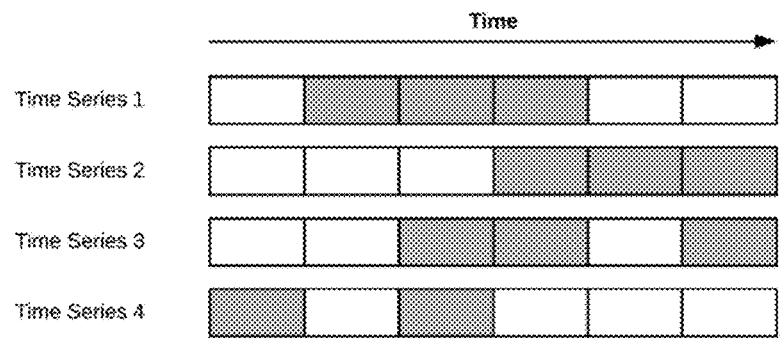
FIG. 3 shows an example of a third level query in a time series database.
Figure 4:
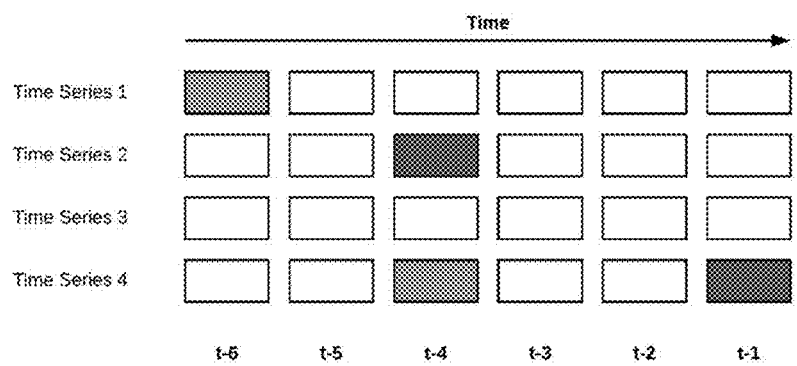
FIG. 4 shows an example of a query in a time series database.
Figure 4:
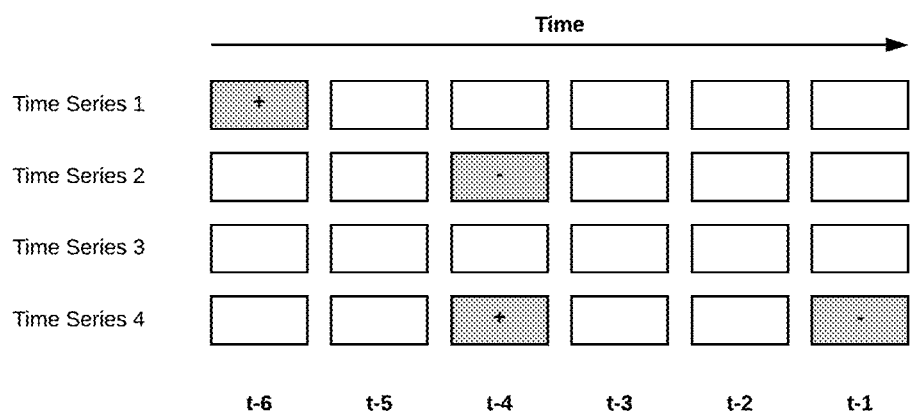
Figure 5:
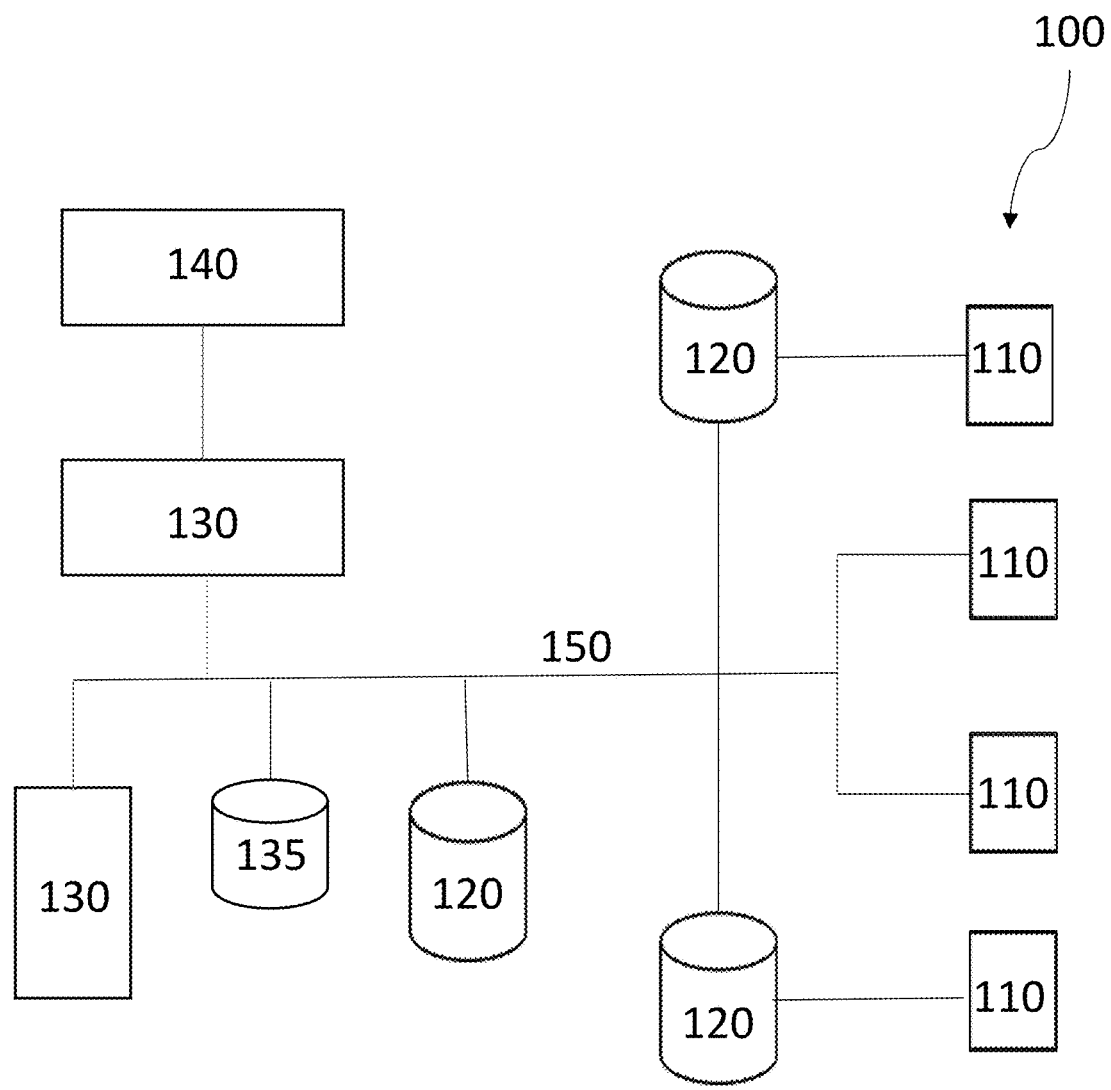
FIG. 5 shows an outline of the database management system.

FIG. 5 shows an outline of a database management system 100 to support third level three queries in which data is fetched from a series of sensors 110 over time and stored in a plurality of storage media 120 in a cluster. The data in the storage media 120 can be accessed through the network 150.

One or more processors 130 receives queries from several input devices 140 and are able to fetch data from one or more of the plurality of storage media 120 through a network 150. The plurality of storage media 120 are not (necessarily) centrally located. Indeed, it will be usual to keep the plurality of storage media 120 close to the sensors 110 from which the data is fetched to save long distance data transfer. Two of the processors 130 are shown in FIG. 5 connected to the network 150. These number of the processors 130 is not limiting of the invention. The processors 130 are not necessarily co-located with the plurality of storage media 120. Indeed, as will be explained below, there is no need for co-location as the processor 130 splits the queries and send the split-up queries to different ones of the plurality of storage media 120 for accessing the data.

In this document it will be assumed that accessing the data in a local disk 135 is less expensive (in CPU wait time) than fetching in-memory cached data from others of the storage media 120 in the cluster over the network 150. The database managing system 100 is therefore designed to minimizing data transfer within one of the computers 130 and within the cluster and maximizing query throughput.

Analytics queries compute over large time windows and consume a lot of data. Thus, minimizing of data transfer enables a reduction in the time of computation and reduction in the use of resources, such as bandwidth on the network 150.

There are many parameters involved in the data partitioning system. From hardware parameters (e.g., available memory), over data level (amount of data per time series) to application parameters (amount of time series in a single query, amount of historical data). Data and application parameters also change over time. Our auto-optimizing data partitioning system will adjust the data partitioning and distribution of data over the cluster in response to said parameters to optimize query answer time.

A time series is a conceptually infinite data structure and so new data is continuously being appended to existing data. As a result, the time series data of a time series will always be partitioned over multiple ones of the data chunks. In the logical view of the data, on which a user will write queries and to which the query is addressed, this technical detail is hidden. The user can write the query on the complete history of the time series data, without knowing whether or how the time series data is partitioned "under the hood", i.e., on which ones of the plurality of storage media 120.

The written query on the logical data view must be translated to a set of instructions in order to be able to access the physical data on one or more of the plurality of storage media 120. In other words, the written query defined on any set of time series and over any time period to access the time series data is translated into a sequence of function applications on sets of data chunks on the storage media 120. The results of these function application are combined into the answer to the query. It is the job of the query processor to do this splitting and combining.

This way of working is generally known in a Big Data ecosystem as map-reduce computing and comprises two phases. The first phase is termed the "map phase" and applies a function on a plurality of the data chunks. The second phase is termed the "reduce phase" and combines the results of function applications on each of the plurality of the data chunks into a final result. One example of the map-reduce computing is a word count in a text. In this example, the need is to count the number of occurrences of each word in a collection of words forming the text. The map function in this example is a function that counts the occurrences of each word in each of the plurality of the data chunks to form a data pair denoted (word, chunk count) where the "word" is the word counted and "chunk count" is the number of occurrences within the chunk. The reduce function combines these data pairs of (word, chunk count) into a final data pair (word, dataset count), by summing up all chunk counts of a word.

Another example is the sum function which is performed over a dataset of numbers. The map phase simply sums all numbers in the data chunks to form a chunk sum and the reduce phase is used to sum all chunk sums into a final dataset sum. Another example is computing the average value of a dataset that is spread across multiple ones of the data chunks and is done with a map function that computes the sum and count of each data chunk. Then the reduce function combines the chunk sums and counts into an overall sum and overall count (by summing the sums and summing the counts). From the overall sum and count, the reduce function deduces the average value of the entire dataset. A final example is computing the standard deviation of a dataset. This is done by first computing the average value as describe above, and then doing another map phase in which the sum of squared differences is computed per data chunk to give a plurality of partial results. The reduce phase combines those partial results into a final result.

This approach is not limited to one or two rounds of map-reduce. Iterative algorithms can do a variable number of rounds based on the data and the functions.

The concept of map-phase computing can be used to perform the level three queries explained in the introduction. In these level three queries, advanced analytics queries combine multiple time series in non-aligned time periods. The performance of the query correlates directly with the ability of the computers in the cluster to provide a map function and compute an intermediary query result on the requested data chunks, i.e., the data chunks holding the data required for the analytics query. If those requested data chunks are provided without (or with minimal) network transfers, the overall query performance greatly improves.

As a running example let us consider the case of computing a Vector Auto-Regressive (VAR) model for time series X, with a set of independent time series Y (in this case Y1 and Y2), in a time period P with a maximal log of L. A VAR model expresses the value of X at any timestamp t (in a time period P), in terms of a linear relationship of the time series Y, from timestamp t-1 up to t-L. This process is shown conceptually in FIG. 6.

A non-limiting example of this computation would be to consider a valve and upstream pumps in a production facility. The time series X could be the output pressure of a valve and Y1 and Y2 could be the output pressure of two upstream pumps. The VAR model would calculate the relationship between the output pressure the two upstream pumps and the output pressure of the valve. This would be useful to see if the maximum output pressure the valve might be related to the output pressure of the two upstream pumps.

Let us assume, that for each timestamp t in period P, there is a set of linear equations expressing $X^t$ in terms of $Y_1^{t-1}$ up to $Y_2^{t-L}$ with unknown coefficients. The VAR model learns the best coefficients in order to match each value of $X^t$ as closely as possible. The complete dataset needed to compute the best set of coefficients for this VAR model comprises the time period starting at the start of P-L up to the end of P, for each of the three time series X, Y1, and Y2 shown in FIG. 6. It will be appreciated that FIG. 6 shows only three time series, but this is not limiting of the invention.

Figure 6:
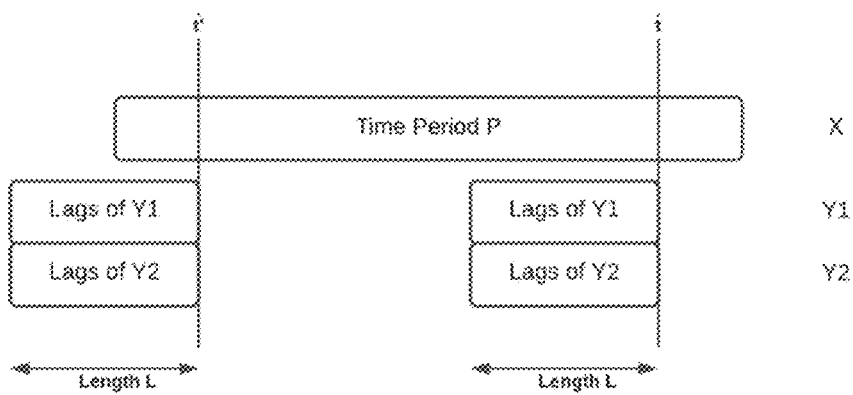
FIG. 6 shows a process for computing a function over time series X with independent time series Y1 and Y2.

Each time series X, Y1 any Y2 shown in FIG. 6 is separately split into equal-length blocks of a fixed time range. The blocks of the same time series, i.e., X, Y1 and Y2 do not overlap in time. The blocks of different ones of the time series may either coincide (and overlap in time) or not overlap (and are "contiguous"). The fixed time range could be an hour, a day, several days, for example. Let us choose one day as the time range. This choice of time range implies that the data of each time series X, Y1 or Y2 for each day is stored in a separate data chunk and for each time series separately. The data chunks may be on different computers throughout the network. Because the data is split into the fixed time ranges per time series, given a request for a time series X and a time period P, the system can efficiently deduce which ones of the data chunks constitute the requested data.

The blocks are grouped into a zone. The zone consists of a whole number of consecutive blocks. Taking the above example, the blocks containing one day of data are grouped in a zone of, for example, seven days, i.e., a week. The blocks do not overlap and so the zones for a time series also do not overlap. It is easy to deduce from one of the blocks to determine in which of the zones the block belongs, and vice versa, and also to determine the block time ranges that make up the zone. The blocks and the zones are defined by time ranges and so they too have both a natural order. It is therefore possible to term "previous zone" as the zone that predates the current zone and is thus contiguous to the current zone.

In one aspect of the system, each one of the zones is assigned to a computer in the cluster by means of a partition function, e.g., a hash partition based on the zone's time range. As a result, all of the blocks in the zone of each time series in the system are located on the same computer in the cluster.

Taking the query shown in FIG. 6. The result of the query in X depends on values of Y1 and Y2 which occurred earlier. In other words, the query has a lag on a time series and needs to virtually shift time. As a result, if the query needs the values in one day (i.e., in one block in this example), the lagged values of another one of the time series might not be in the same day, because the lagged values are time shifted. As a result, non-aligned ones of the blocks are needed to perform the computation.

Because consecutive or contiguous blocks are located in the same zone, there is no problem if the oldest block of the zone is not involved in performing the computation (and assuming the lag is smaller than one block size). It was stated above that all of the blocks are in the same zone are thereby by definition located on the same computer. This query can be computed by accessing only "local blocks", i.e., those on the same computer.

Figure 7:
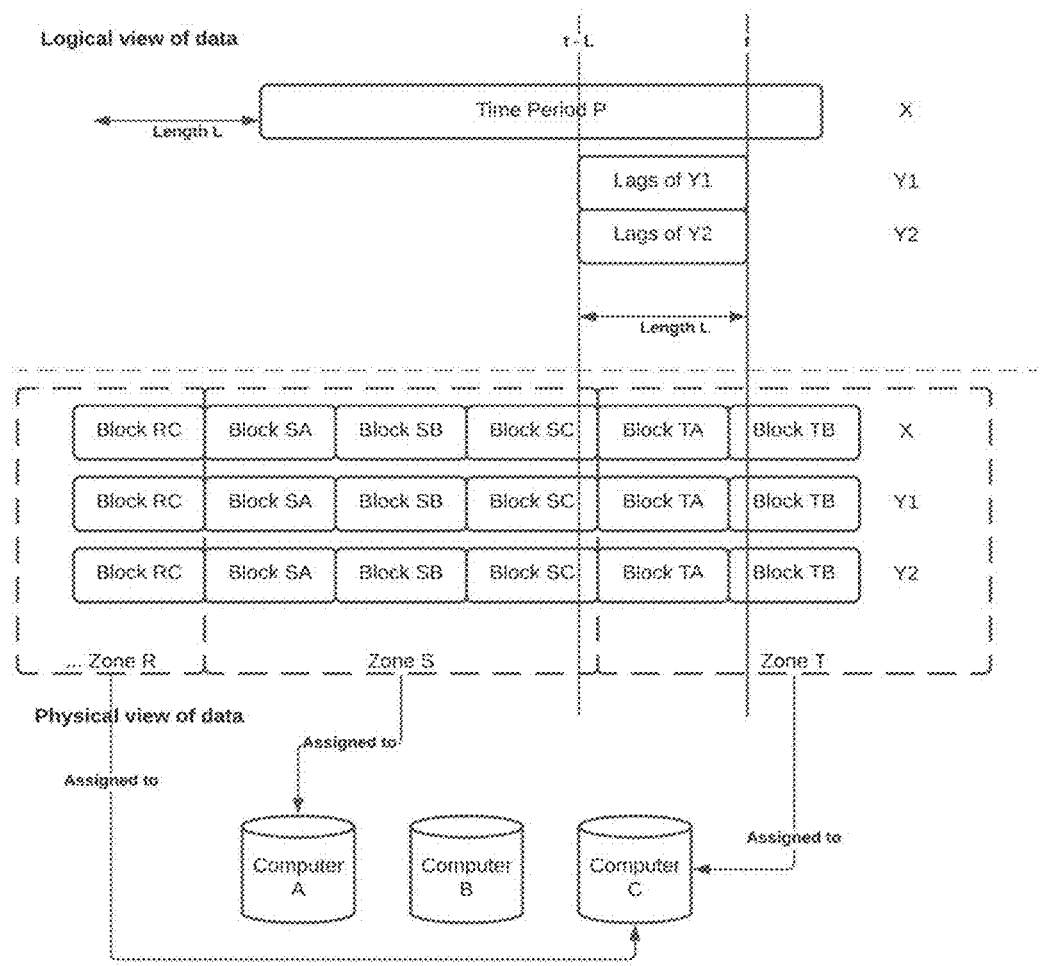
FIG. 7 shows a partitioning scheme for the function.

Returning to the running example of a VAR on the three time series X, Y1, and Y2, in time period P, with a maximum lag of L, in the figure below, a possible partitioning is shown in FIG. 7 with three of the blocks in one of the zones.

To compute the linear equations of the VAR at the time stamp t, the data of the blocks SC, TA and TB in the zones S and T for all of the time series X, Y1 and Y2 are needed. It will be seen that the blocks TA and TB are part of the same zone and the blocks TA and TB are hence by definition persisted on the same computer C. On the other hand, the block SC is not a local block on the computer C but is located in the zone S on the Computer A. Thus, when executing the map function of the VAR model, in the setup of FIG. 7, the block SC must be fetched from the different computer A over the network involving a data transfer using time and network resources.

To avoid, or at least minimize, the data transfer incurred by the lags that straddle zone boundaries between the zones, a further concept is introduced in the data partitioning system. A boundary copy of the data is a suffix of the blocks from the previous zone (termed zone Z-1 in this example) which is located in the contiguous zone Z. In other words, the last N blocks of the zone Z-1 are assigned to both to the zone Z-1, but also to the zone Z. The parameter N is a configurable or optimizable parameter.

It will be appreciated that copying the blocks from a previous zone into the current zone is equivalent to copying the blocks from the current zone into the previous zone. Instead of executing a computation on the computer responsible for the current zone, the computation could be executed on the computer responsible for the previous zone. The fact that this description implicitly assumes that copying the blocks from the previous zone into the current zone is non-limiting for the invention. Furthermore, copying of the blocks both from the previous and next zone into the current zone is possible. This allows for more flexibility in choosing the computer on which to execute the computation, at the cost of additional data redundancy.

Figure 8:
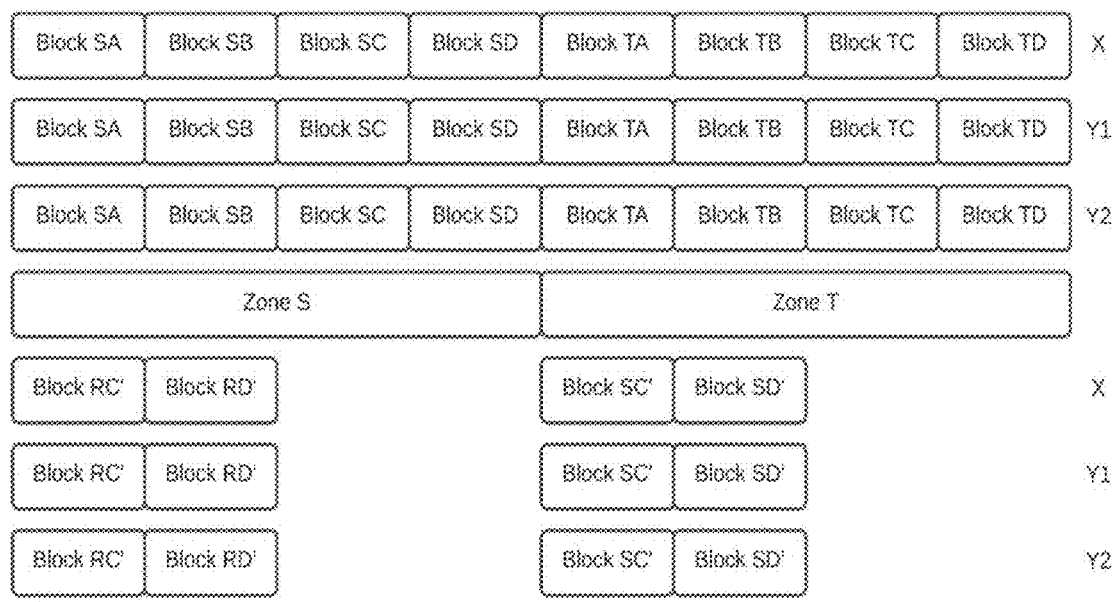
FIG. 8 shows an example of a data partitioning scheme.

FIG. 8 shows an example of a data partitioning with four blocks per zone and a boundary copy of size 2. The block SC which is the second to last block in the zone S is also assigned to the zone T under a slightly different name SC' but with the same data. The different name is merely to differentiate both blocks, although they contain the same data, hence every block name has a unique location. The zone S and the zone T may be located on different computers.

Figure 9:
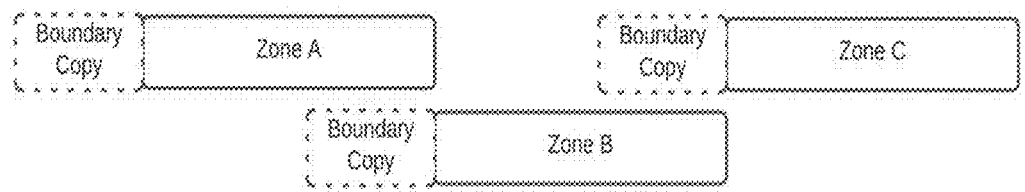
FIG. 9 shows zones and boundary copies.

FIG. 9 shows the zones and boundary copies on a conceptually higher level. It can be seen that by extending the zones (in FIG. 9 A, B and C) with a boundary copy (shown as a dotted rectangle to the right of the zones A, B and C), then the zones become overlapping. There is still a clear ownership of each block by the zone. With this layout any lag up to two block sizes can now be handled by a single computer.

It was noted above that it is possible to adjust the size of the blocks, the size of the zones and the size of the boundary copies. The adjustment of the sizes of the blocks and the zones enables the grouping of the blocks into zones to optimize the size of the blocks and the zones for the given hardware, while keeping the blocks with the data together along the time dimension. The time-based aspects are the predominant dimension in any query on a time series database.

A data redundancy technique is also enabled that is aware of the time dimension in time series, i.e., the data redundancy technique outlined in this document takes the structure of the data into account when placing redundant copies of blocks. The prior art data redundancy techniques have not been able to take the data structure into account when generating and placing redundant copies.

Figure 10:
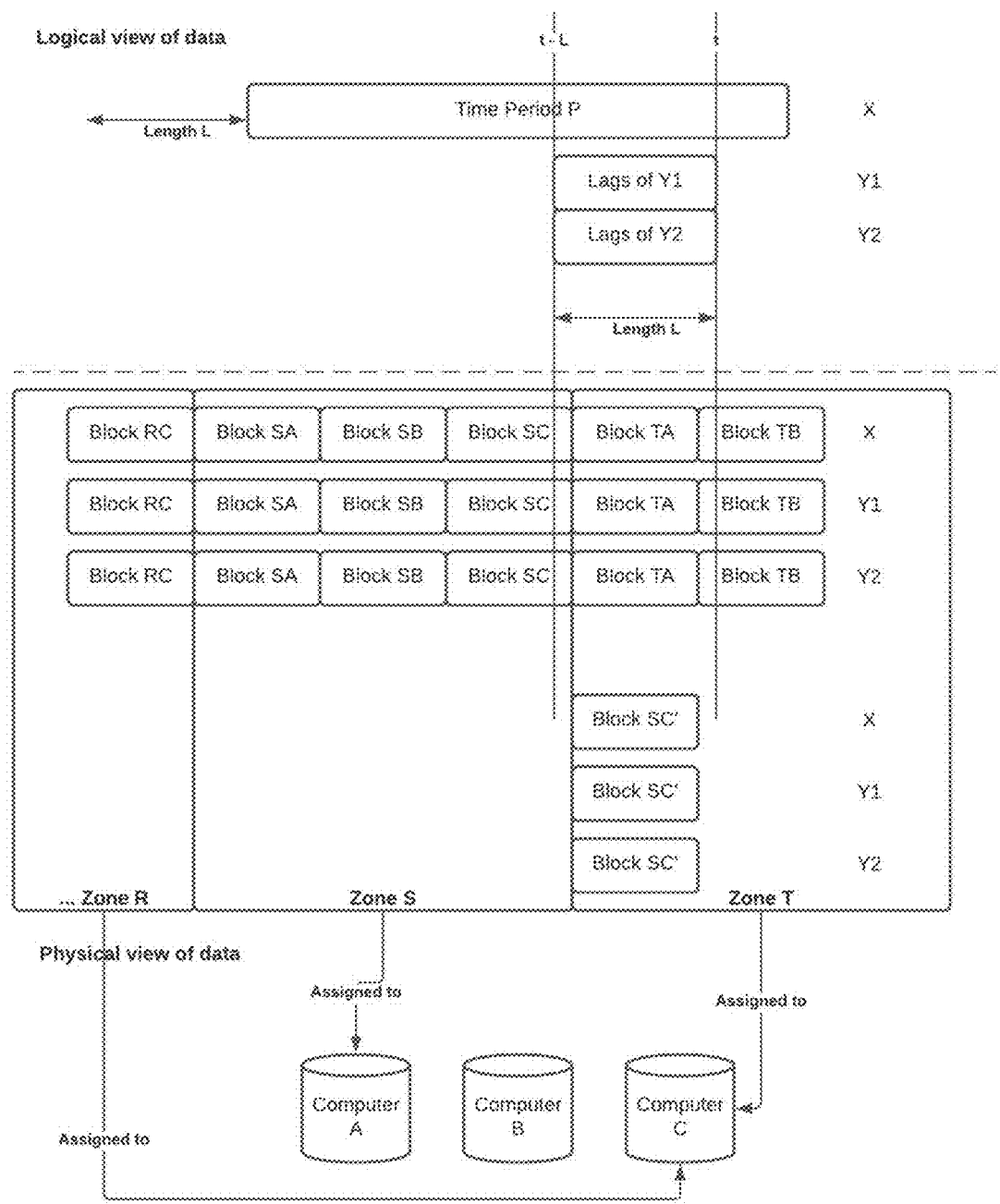
FIG. 10 shows the partitioning scheme with boundary copies.

Returning to the example above, FIG. 10 shows a modification of the same example in FIG. 7, but with boundary copies SC' added. It can be seen that the computer C now has a zone T assigned to the computer C on which all of the data chunks (SC', TA and TB) required to compute the VAR equations at the timestamp t are stored.

Figure 11:
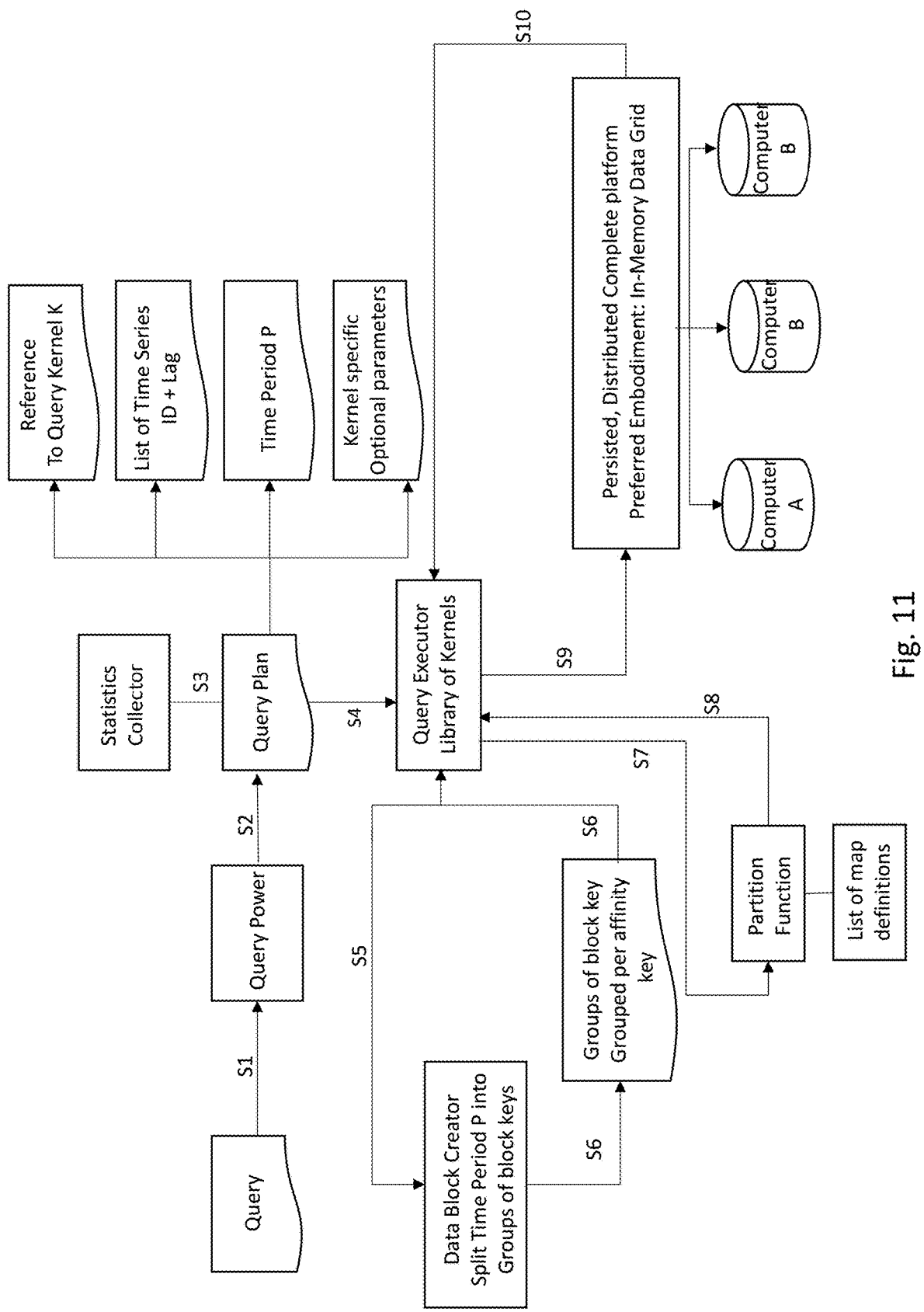
FIG. 11 shows a flow of a query.

FIG. 11 describes the flow of a query and how the query gets translated into map functions being executed on blocks on a specific computer A, B or C for a persisted, distributed computer system. The query is submitted in step S1 to the database system 100, either by a user or another application. A query processor in the database system is responsible for parsing in step S2 the query into a query plan. The query breakdown is a structured way of defining which map function(s) should be executed on which time series in which time period. The query plan (or parsing) is a common operation in all database engines. There are several open-source options that can be used and these include, but are not limited to, SQLite, PostgreSQL, MariaDB.

From the query plan the system derives the necessary statistics, and these statistics are sent to a statistics collector in step S3. The statistics collector collects the statistics and monitors for drift in the statistics. For example, if the system observes an increased maximum lag, this could be a trigger for increasing the boundary copy size (as will be explained later). The query breakdown is also sent to the query executor in step S4, which will further translate the breakdown into actual functions being executed on computers in the cluster.

First, the time period P is split in step S5 in a data block creator which splits the time period P into time ranges corresponding to the time periods for the data stored in with blocks in step S6. The data block creator produces a list of the keys. As noted below, the key corresponds to a time period and to a time series identification tid and this is sent in the persisted, distributed computing platform. to a partition function in steps S7 together with the time series (with their relative lags). The partition function knows to which one of the computers A, B and C in the cluster a specific time range is assigned. The partition function returns for each map definition an assigned one of the computers in step S8 on which the query is to be run. With this assignment, the query executor knows which function F to apply to which time series X (with relative lags) on which computer. The query executor then sends the function F and the map definition to the assigned computer in step S9. The assigned computer A, B or C executes the function F on the requested data and returns the map function result to the query executor in step S10, which returns all the results to the query processor. The query parser can then decide to run another function F', or to compile the map function results into the result for the query.

In an alternative aspect, using Apache Ignite In-Memory Data Grid having the partition (or affinity as it is called in Ignite) key of a data block is sufficient to execute a function and thus steps S7 and S8 are not performed and instead the query executor is able in step S9 to send the function directly to the assigned computer A, B or C.

To illustrate this query processing in more detail, let us look at a concrete instantiation of the above example. Suppose a VAR model on time series x, y and z, of order 5 minutes (i.e., with a maximal lag of 5 minutes) over a time period P from 2020-10-18T22:30:00 to 2020-10-19T08:00:00 is calculated. Suppose furthermore that the block size is 1 day, zone size is 1 week (=7 blocks), and boundary copy size is 1.

To compute the coefficients in the VAR (linear) equations, an iterative algorithm called Stochastic Gradient Descent can be used. In a nutshell, the iterative algorithm will compute the predicted value for x at every timestamp t, compute the error between the prediction and the actual value $x_t$, and compute a delta on each coefficient in order to minimize the error. After one such iteration, all of the deltas are collected, the coefficients are adjusted, and a new iteration is started. This continues until the error is sufficiently small, or a maximum number of iterations is reached. In this example, the function F represents one iteration of the Stochastic Gradient Descent algorithm.

The function F, the time period P and the set of time series is sent to the query executor. Given the block and zone sizes, the time period P is split into two block time ranges: b1=[2020-1018T00:00:00, 2020-10-19T00:00:00] and b2=[2020-10-19T00:00:00, 2020-10-20T00:00:00]. The partition function will then assign the two block time ranges b1 and b2 to their respective computers, say C1 and C2. As a last step, the query executor combines all these pieces of information into to map function invocation. The first map function will run on the block range b1 for time series x, y and z, and will be executed by the computer C1. The second map function will run on the block range b2 for the time series x and the block ranges b1 and b2 for the time series y and z and will be executed by the computer C2. The time series y and z need two blocks in the second run, because the two blocks have a lag of up to 5 minutes. To compute the value of $x_t$, with t the first/oldest timestamp in the time block b2, the map function needs the values $y_{t-1}$ to $y_{t-5}$ and $z_{t-1}$ and $z_{t-5}$, which are in the time block b1. Due to the boundary copy, the time block b1 is also present on the computer C2. Hence the computer C2 can compute the function F on the block b1 for the time series x and the blocks b1 and b2 of time series y and z.

Figure 12:
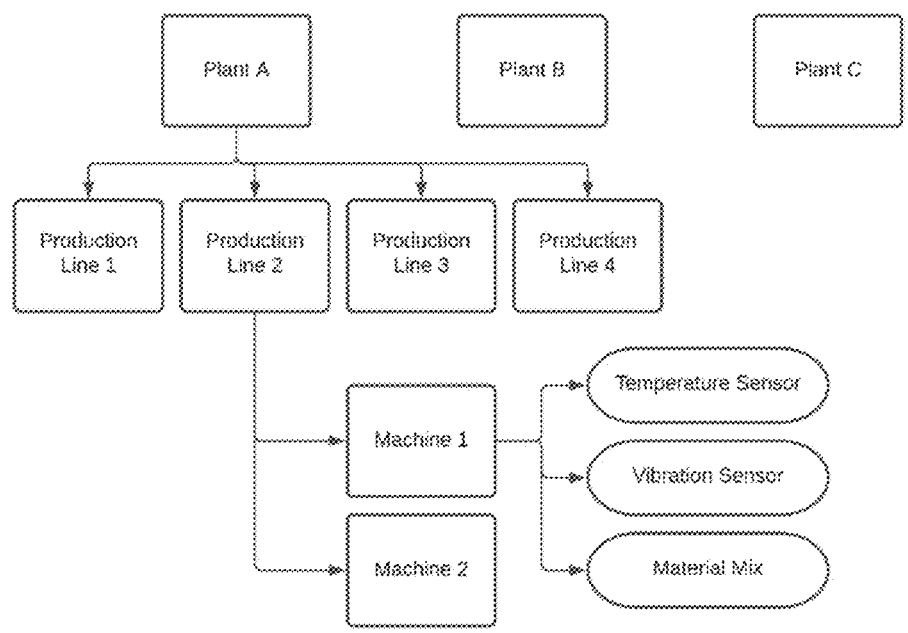
FIG. 12 shows a hierarchical grouping of the time series.

In some cases, there is a (hierarchical) grouping of the time series in the database system. Think for example about sensors on machines in a production plant. In such a case it does not make sense to combine a sensor of plant A with a sensor that is located in plant B, for the simple reason that these sensors are physically separated and the processes in one of the plants (A or B) cannot influence processes in the other one of the plants (B or A). It will be appreciated that if the processes in the different plants A and B would be able to influence each other, e.g., an upstream and downstream plant, the plants A and B should be in the same group. This is illustrated in FIG. 12.

If such a grouping is available, a different zone assignment function can be used for each of the groups. As a result, the current zone (i.e., the zone in which new data from the sensors is written), will be located on different computers in the cluster for each group. The load of receiving the new data and writing the new data to a persisted storage medium is thus spread across more computers.

A fist query on a time period P executed for the plant A will be executed on different ones of the computers than a second query on the same time period P for the plant B. Indeed, the zones assignment puts each of the zones of a group to different ones of the computers. Hence this improves the parallelism and efficiency of the database system.

The data partitioning scheme with the blocks, the zones and the boundary copies is, as noted above, flexible. The performance of query resolution on our system depends on a set of parameters controlling the data partitioning. In particular, the size of a block, the size of a zone, and the size of the boundary copy need to be finetuned to perform well.

With a bigger block size, more can be computed from a single block. However, a bigger block size has some down sides. The bigger block consumes more memory per block, reducing the number of the blocks that can be cached in-memory. As the block size increases, finding a particular time range within the block becomes more time consuming, or it is necessary to maintain an index structure on each one of the blocks. Within a single computer there are typically multiple cores carrying out computations. The bigger a block, the fewer blocks span a given time range, hence less parallelism within a single one of the computers.

On the other hand, making the blocks too small will incur a more overhead with respect to bookkeeping of the data blocks, and needing more map processes to process all of the blocks. Another typical operation on the time series is a sliding window. Last but not least, the block size has an impact on the size of the boundary copy. If most of the requested lags fall within one block size, a boundary copy of size 1 would suffice. If most of the requested lags are a lot smaller than one block size, reducing the block size would reduce the overlap of zones and hence the duplication of data.

A small zone will lead to more parallelism between the computers. As a requested time period will be covered by more of the zones, the query is split up over more of the computers. A large zone, on the other hand, reduces the amount of data redundancy. With equal boundary copy size, the percentage of data redundancy drops as the number of blocks in a zone grows. For example, a zone of size 3 with a boundary copy of size 1 has 33% data redundancy. If the zone has 5 blocks, there is only 20% data redundancy.

Finally, the boundary copy size is driven solely by the requested time lags. If a big enough portion of requested lags falls within the boundary copy, our system will greatly reduce data transfers and hence improve query performance.

The parameters that influence the block size, the size of the zone and the size of the boundary copy can be considered. On the hardware level the following parameters are relevant:
Available memory—more memory allows for bigger blocks and ore in-memory caching
Available processor cores—more cores mean less memory per core
More blocks per zone for increased parallelism within a single computer
Available disk space—more disk space facilitates more redundancy, i.e., bigger boundary copies, with bigger blocks.

On the data level the following parameters are relevant:
Cardinality—a larger number of time series mean more of the data blocks on disk—i.e., bigger ones of the blocks of data are better
Frequency—the higher the frequency of a time series (i.e., number of data points per second), the bigger blocks are.

On the application/query level the following parameters are relevant
Cardinality—more time series in a single query means more of the blocks that need to be loaded, meaning that smaller blocks of data are better.
Lag—longer lags are better served with bigger ones of the blocks and/or bigger ones of the boundary copies.
Time window
Queries on a short time window are better served by smaller blocks and zones, as the system can parallelize more.
Queries on longer time windows might benefit from bigger blocks and smaller zones to parallelize more over computers.

A very simple algorithm to compute block, zone and boundary copy sizes is to ignore all parameters but data frequency and machine memory and cores count. As an example, it is possible to set some simple thresholds based on the average data frequency.

| Average Frequency | Memory per core | Block size | Zone size | Boundary copy size |
| --- | --- | --- | --- | --- |
| ±1 ms | <=256 MB | 10 minutes | 1 hour | 1 |
| | <=1 GB | 1 hour | 6 hours | |
| | >1 GB | 2 hours | 12 hours | |

-continued

| Average Frequency | Memory per core | Block size | Zone size | Boundary copy size |
| --- | --- | --- | --- | --- |
| ±100 ms | <=256 MB | 1 day | 1 week | |
| | <=1 GB | 1 week | 1 month | |
| | >1 GB | 2 weeks | 2 months | |
| 1 second | <=256 MG | 2 weeks | 2 months | |
| | <=1 GB | 1 month | 0.5 year | |
| | >1 GB | 3 months | 1 year | |

The assumption underlying this table is that a lag will always be in proportion to the block size. Optionally, the boundary copy size can be increased to 2, as in most configuration the zone is at least 4 blocks.

When new data is written to the system, statistics are collected on the data frequency of the time series and sent to the statistics collector.

Typically, only small segments of the data are written for each time series, for example, the last second of data. The data frequency can vary widely on such short segments. Hence, the writing process will only deduce the data frequency after a certain grace period, e.g., only after one hour has passed since the last assessment of the data frequency for a given time series.

To assess the data frequency, the last grace period is fetched, and the approximate data frequency is calculated by counting the number of data points in that time period and offsetting it to the period duration. This results in a points per second number: the empiric data frequency. This number is sent to the statistics collector along with the identifier of the time series.

It was noted that the sizes of the blocks, zones and boundary copies size can auto-optimised based on the statistics kept by the statistics collector. Each statistic tracked by the statistics collector can be thought of as a time series. The new measurements/data points arrive at a certain pace. The job of the statistics collector is to monitor for change in the data points or drifts in the time series of each tracked parameter (e.g., data frequency of temperature sensor, or lag used in queries). Whenever there a "noticeable" change in one of the tracked parameters, an update of the estimated value of the tracked parameter should be sent out by the statistics collector. Many excellent drift detection and change point detection algorithms exist.

Examples of such drift detection and change point detection algorithms include the PELT algorithm described in R. Killick, P. Fearnhead, and I. Eckley. Optimal detection of changepoints with a linear computational cost. Journal of the American Statistical Association, 107(500):1590-1598, 2012 (available at https://ctruong.perso.math.cnrs.fr/ruptures-docs/build/html/detection/pelt.html), Window-based change point detection (available at https://ctruong.perso.math.cnrs.fr/ruptures-docs/build/html/detection/window.html, and SDVAR described in https://www.semanticscholar.org/paper/Change-Points-Detection-of-Vector-Autoregressive-Saaid-Nur/c56d4adad7ed3f504015bc6bbc663e21e55f174b?p2df.

The median value is a good estimator for the data frequency parameters. Lags might be skewed (a few very long lags), and the system should not start updating the boundary copy size just because there was a query with a very long lag. Therefor a percentile is a good estimator for the lag parameter. For example, the 90-percentile is a good trade-off between supporting a lot of the queries with the boundary copy size and not getting an overly large boundary copy. So called data sketches (randomized, approximately correct algorithms) can be used to quickly deduce any percentile on a time series.

The implementation requires a persisted, distributed compute platform available on the computers in the cluster. This distributed compute platform needs to (1) have an affinity co-location feature, (2) have in-memory caching capabilities, and (3) be able to execute functions on the computer hosting a data item. Non-limiting examples of such platforms include in-memory data grids, like GridGain Ignite, HazelCast In-Memory Data Grid or Oracle Coherence. In one aspect, GridGain Ignite platform is used.

Quintessential to these affinity-aware in-memory data grids is the concept of affinity colocation. In GridGain Ignite this is implemented by assigning two keys to any data item: an object key and an affinity key. In the system, each data block is assigned a key and affinity key as follows.

The key of a data block consists of the time period of the block and the time series id. For example, given a block size of one month and a time series id A123, the block key for the month of January 2020 is 2020_01_A123. The block key for the same time series, but the month of December 2019 is 2019_12_A123.

The affinity key of a data block consists of the zone time period to which it belongs. For example, given a zone size of 6 months, the affinity key for the data block representing January 2020 for time series id A123 is 2020_1, meaning the first half of 2020. The affinity of the month of February is exactly the same: 20201. The affinity key of the month of December 2019 has affinity key 2019_2.

Data is distributed in the in-memory data grid based on the hash of the affinity key. Consequently, all of the data blocks that have the same affinity key are assigned to the same computer. As a result, all data blocks for January 2020 for any time series are assigned to the same one of the computers in the cluster, as the data blocks all have the same affinity key: 2020_1. Likewise, the data blocks for February are also stored on the same computer, because the data blocks for February have the same affinity key. The data blocks for the month of December have a different affinity key and hence they are not guaranteed by the hash function of the affinity key to be stored on the same computer. Finally, it will be understood that the data blocks for January 2019 have a different affinity key from January 2020 (2019_1 respectively 2020_1), hence the data blocks of January 2019 can be assigned to a different computer than the data blocks of January 2020.

Last but not least, the database management system keeps track which keys are part of a boundary copy. For example, assuming a block size of one month, a zone size of half a year and a boundary copy of size 2. The database management system can easily detect that the month of December 2019 is part of a boundary copy. The data block for time series A123 of December 2019 will be stored in the in-memory data grid with key 2019_12_A123 and affinity key 2019_2. Moreover, it will also be stored with key 2019_12_A123_b and affinity key 2020_1. Because the copy is stored with a different key the copy can be distinguished from the original. Because the copy has the same affinity key as the blocks in the zone 2020_1, it will be stored on the same computer as the 2020_1 zone.

EXAMPLES

To describe the implementation of query execution four queries will be used as examples. These examples are not limiting of the invention. The following will be assumed in all of the example:

Correlation between N time series over a time period P
Sliding window correlation between 2 time series in a time period P
VAR over N time series for time series X over a time period P with a maximal lag of L The first query will compute the pairwise Pearson's Product-Moment correlation coefficient of a given set of time series in a given time period P (P is identified by a start and end datetime). This query can be computed in a distributed fashion if the corresponding data blocks of all requested time series are available. For example, if January 2020 is part of time period P, all of the data blocks of January 2020 for the requested time series need to available on the same computer. This is the case in the database management system using the (affinity) key design In a prior art system, this query would need to transfer data if requested time series are not assigned to the same shard (InfluxDB)/data node (TimeScaleDB). Given that the set of requested time series is not known up front, there is no guarantee that this is the case. Hence, incurring network transfers.

Figure 13:
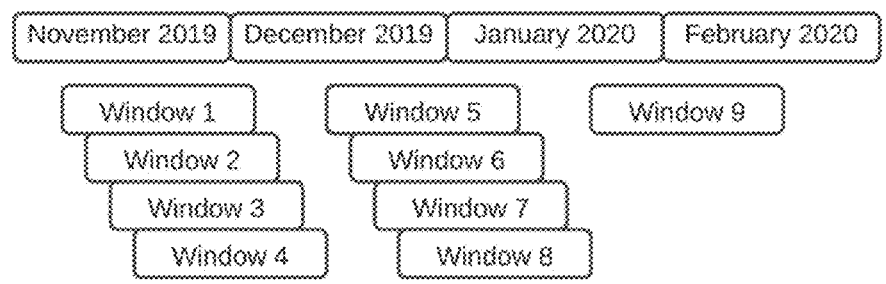
FIG. 13 shows a sliding window query.

The second query is related to the first query in the sense that the answer to the query is the Pearson's Product-Moment correlation coefficient. In this query, a sliding window is applied to the time series as can be seen from FIG. 13.

The challenge is the fact that the sliding windows can span across multiple ones of the data blocks, e.g., Window 1 straddles data blocks November 2019 and December 2019. The query will then compute the correlation coefficient between the two requested time series in each window. Clearly, in the database management system any two consecutive blocks are always locally available on a single one of the computers, if the boundary copy is at least 1 block in size.

In the prior art systems, this query can only be answered without network transfers if both time series are assigned to the same computer. In that case, the computation can be split up by computing the different components of the Pearson's Product-Moment coefficient separately and combining the parts into the final coefficient afterwards. If the time series are not assigned to the same computer, network transfers are needed.

The third query is computing a VAR model over a given time period P. A VAR model consists of a dependent time series X and a set of independent time series Y. The model is defined by the coefficients for all the independent time series and all possible lags up to the maximum lag L. E.g., 3 independent time series with a maximum lag of 3 results in 4 coefficients per independent time series (plus another constant coefficient), resulting in 3×(4+1)=15 coefficients. The computation will find the best set of coefficients for time series X in time period P by a method called stochastic gradient descent.

Given start date S and end date E in time period P, there is a set of equations for each timestamp t from S+L up to E. Stochastics gradient descent is an iterative algorithm, hence multiple rounds of computation need to be carried out. If the lag is smaller than the time period spanned by the boundary copy, all of the data needed to compute a set of equations, is locally available in a single computer.

In InfluxDB data is sharded both on time and space, meaning that there is no guarantee that all data for all lags of a single time series are present on a single computer. Moreover, there is no guarantee that the all the requested time series (dependent X and independent Y) are assigned to the same computer. Hence, to compute the answer to such a query on InfluxDB, for sufficiently long time period, lag and sufficiently large number of time series the probability of network transfers borders certainty.

In TimeScaleDB, data is space partitioned. As a result, all lags for a single time series can be computed on a single computer. However, combine different time series is again not guaranteed to be possible on a single computer, as different time series can be assigned to different computers in the clusters.

All three queries outlined in the example can be computed without a data transfer (given that the boundary copy size is correctly deduced by the system or pre-configured by the administrator).

On the contrary, the prior art systems offer no guarantees with respect to data locality. Although one might hit a lucky spot and find all data local on a single computer, chances are very low that this will happen. As a result, prior art system will need network transfers of data blocks to be able to compute the answer to the above presented queries.

As noted above, FIG. 11 shows an outline of the query execution. The query is passed to the query processor (also called parser) in step S1. The query can be in text-form, e.g., CORRELATE cpu0, cpu1, cpu2, cpu3, request-queue, memory-in-use FROM 2020-11-21T12:32:00Z TO 2020-11-22T23:42:00Z. The preferred embodiment of a query is a remote procedure call gRPC request to the system which specifies a kernel, (i.e., a computational routine to execute the query), a list of time series ids with associated lags, and a time period in which the query is executed. The kernel can accept optional parameters, e.g., the maximum lag in a VAR query, the sliding window size, etc.

The query parser accepts the gRPC requests and extracts the parameters. The parameters of the query are then put into a query plan in step S2. The query plan is handed to the query executor in step S4. The query executor has a set of kernels to execute query plans. The kernel function reference (i.e., the name) is taken from the query plan and the correct kernel is selected.

Next, the query executor passes the time period, time series ids and lags to the data block creator in step S5. The data block creator creates block keys for each time series and each block range in the requested time period, taking the lag into account. The block keys are then grouped by the block time range, taking lags into account. For example, if time series cpu0 and cpu1 are requested, with a maximum lag up to 5 minutes for a time period from 202001-01T00:00:00Z to 2020-02-15T00:00:00Z, then the group for January 2020 (assuming block size is one month), will contain the keys for December 2019 and January 2020, as both the time ranges are needed to compute values from 2020-01-01T00:00:00Z. Indeed, a maximum lag of 5 minutes implies that the computation needs to access up to 2019-12-31T23:55:00Z, when computing a value at timestamp 2020-01-01T00:00: 00Z.

The data block creator takes boundary copies into account. So, if December 2019 and January 2020 are grouped together, the boundary copy key of December 2019 is used. For example, for time series cpu0 that would be the keys: 2019_12_cpu0_b and 202_01_cpu0. The _b suffix denoting that it is a boundary copy.

The groups of block keys are passed back to the query executor in step S6. Then, if required, the kernel will execute a map function on each group of keys in steps S7 and S8. The choice of map function depends on which kernel executes the query. This implies that the map function is executed on the blocks referenced by the keys in the group. Continuing on the above example, executing a map function for the January 2020 group on the persisted, distributed compute platform in step S9 will provide the map function with four blocks references by the following keys: 2019_12_cpu0_b, 2020_01_cpu0, 2019_12_cpu1_b, and 2020_01_cpu1. It will be noted that the block keys for the previous zone (2019_2; December) are the boundary copy keys. Hence, the boundary copy keys are stored on the same computer as the 2020_01_cpu0 and 2020_01_cpu1 blocks.

The result of the map function is sent back to the query processor in step S10. The kernel executing the query will then decide whether the kernel returns a final result or will request to execute more map functions on the data grid. This depends on the specific kernel.

Let us consider the three example queries to understand how the query is executed on our system.

For the first query, the query plan contains the N requested time series (there are no lags in this query), time period P and a reference to the correlation kernel. Assume that the N time series are cpu0, cpu1, cpu2, cpu3, request-queue, and memory-in-use. Assume that time period P is from 2020-06-29T00:00:00Z to 2020-07-03T12:00:00Z. The query executor selects the correlation query. Next, the data block creator looks at the time series and produces two groups of block keys. The first group contains the 2020-06 blocks for every time series, the second group contains the 2020-07 blocks. Because there are no time lags, there is no time overlap between the groups. Next, the query executor requests from the compute platform to run a map function on each group of block keys. This map function computes the sum of each time series within the time period within the blocks presented to the map function. It also computes the sum of squares and for each pair of time series the sum of the pairwise products at every timestamp. In short, it computes all the components composing the Pearson's Product-Moment correlation coefficient. If both invocations of the map function finish. The kernel combines all the corresponding components and computes the correlation coefficient for each pair of time series.

The second query is conceptually executing the first query for each sliding window. Let flow-in and flow-out be the two time series ids in this query, time period P is from 2020-0629T00:00:00Z to 2020-07-03T12:00:00Z, and the sliding window has a size of 5 minutes. Again, the time series (with a maximum lag of 5 minutes=sliding window size) are sent to the data block creator. It will create two groups of keys. The first group contains 2020_06_flowin and 2020_06_flow-out. The second group consists of: 2020_06_flow-in_b, 2020_07_flowin, 2020_06_flow-out_b, and 2020_07_flow-out. The second group contains boundary copies as, the 2020_06 time range is in the previous zone compared to 2020_07. Hence, to only use local copies, the boundary copy versions of 2020_06_flow-in and 2020_06_flow-out are used. If time period P would be fully within a single zone, the original keys would be used and not the boundary copy keys.

To compute the Pearson's Product-Moment correlation coefficient, it is necessary to compute:
    the sum of flow-in values in the sliding window,
    the sum of flow-out values,
    the sum of squared flow-in values,
    the sum of squared flow-out values,
    the product of flow-in and flow-out, and
    the number of values in the sliding window.

A first step in computing the correlation is resampling the original data blocks into regular, equidistant series of interpolated values. A circular buffer is kept for each of the above measures, and the current value of each sum. Computing a measure for the next sliding window (assuming the circular buffer is filled up with the previous sliding window), is as simply as decrementing the current value of the measure with the last value of the buffer and incrementing the sum with the new value of the current sliding window. The new value is then stored in the circular buffer. Obviously, this is not necessary for the count which stays constant for each window.

The first sliding window ranges from 2020-06-29T00:00:00Z to 2020-06-29T00:05:00Z. This sliding window can be computed in the first group. All sliding windows up to the window ranging from 2020-06-30T23:54:00Z to 2020-06-30T23:59:00Z are computed by the map function on the first block key group. The window ranging from 2020-06-30T23:55:00Z to 2020-07-01T00:00:00Z is computed by the map function on the second block key group.

Both invocations of the map function return a list of values, one for each sliding window. The end result, returned by the query processor, is the union of both of the lists.

The third query uses the well-known stochastic gradient descent method. It is an iterative method that starts with a random set of coefficient and gradually refines the coefficients until an optimal set is found. Computing the gradients for optimizing the coefficients is done by executing a map function on the data.

The interesting part of this VAR query are the data block groups that are created by the data block creator. Imagine a process in a chemical factory with many reactors, pipelines, pumps and buffer tanks leading to an end product. Let the flow of the end product be dependent time series in the VAR model. Let 56 hours be the running time of the process from start to end. And let Y be a set of pressure, flow, temperature sensors on the material involved in the process. Assume a query now, where we want to compute a VAR model for time series end product-flow, based on the set of time series Y with a maximal lag of 60 hours over the time period of the last year (from 2019-11-01T00:00:00Z to 2020-10-31T23:59:59Z). The lag is a bit longer than the known running time, to account for some variations in running time, and effects of previous reactions.

Assuming a block size of one month, a zone size of 3 blocks and a boundary copy size of 1 block. The requested time period spans 5 zones: from 2019_4 (fourth quarter of 2019) up to and including 2020_4 (fourth quarter of 2020). Let's consider some block key groups. For example, the block key group for August 2020 contains 2020_08_end-product-flow and the 2020_08 and 2020_07 block keys for the independent time series. Note: no boundary copies need to be used because 2020_08 and 2020_07 are in the same zone. The 2020_07 block is included here because the timestamp in the first 60 hours of August 2020 need some portion of 2020_07, due to the maximal lag of 60 hours. For example, the block key group for October 2020 contains 2020_10_end-product-flow and for each independent time series in Y, it contains the 2020_10 and 2020_09_tid_b_time ranges (with tid being the time series id of an independent time series in Y). Note: Because September falls into a different zone, boundary copies are used here.

Figure 14:
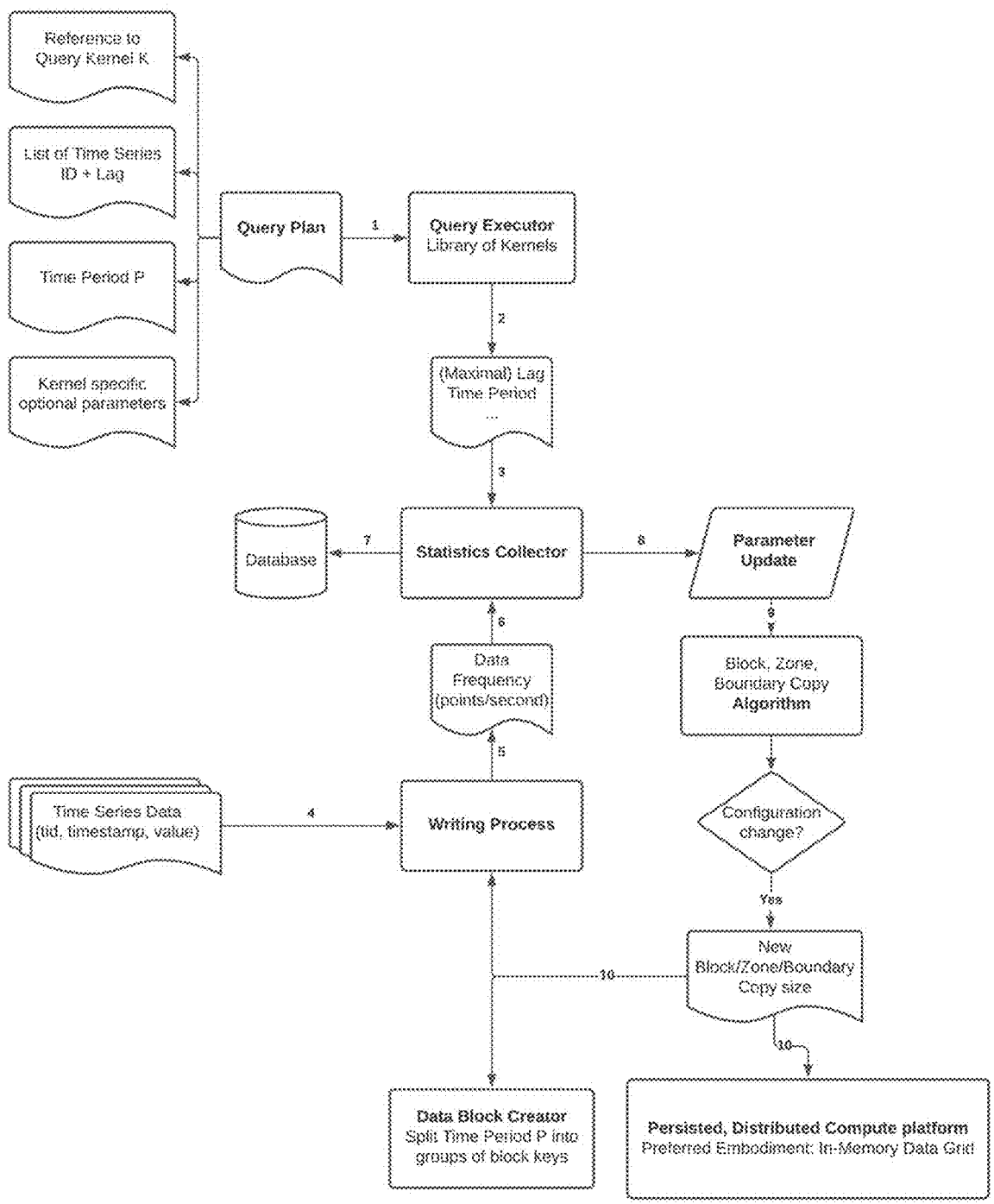
FIG. 14 shows the statistics collector.

The statistics collector is the backbone of the online adaptation strategy of the database management system and is shown in FIG. 14. The statistics collector keeps track of key parameters such as maximal lag, queried time period, and data frequency of each time series.

When a query plan is sent to the query executor in step 14, the kernel responsible for executing the query plan extracts the necessary information from the query plan in step S2. The extracted data (maximal lag, time period, . . . ) are then sent to the Statistics Collector in step S3.

For example, in the first example query there is no lag, so the maximal lag is 0. The time period is simply copied from the query plan. In the second example query, there is no lag, but the query is based on a sliding window, hence the length of the sliding window is extracted as the maximal lag. In the third example query, there is a maximal lag for the VAR model, this maximal lag is extracted.

The Statistics collector receives the sample and stores it in a database in step S7. For each parameter it has a current value. At the start of the system a configurable, a default value is set. Periodically, say every 15 minutes, the statistics collector runs a separate process that computes a representative of the stored samples in the last hour.

For the maximal lag, the query collector computes the 90-percentile using probabilistic algorithms (known as Data sketches). If the 90-percentile of lags differs by 20% from the stored current value of lag a Parameter Update is issued in step S8 and the current stored value is updated in the database. The 90-percentile representative and 20% are the preferred embodiment. Different representatives (95-percentile, moving average, . . . ) and different change thresholds can be configured.

For the time period, the length of the queried time period is stored in the database. The median length is computed over the last day. If the median length differs by 20% from the current stored value a parameter update is issued in step S8 and the new value is stored in the database.

An alternative approach is to use change point detection algorithms (e.g., PELT) on recent samples. For example, applying a rolling window aggregation (90-percentile) on the lag samples, and then applying the PELT algorithm on the last day to see whether there is a change point detected. If a change point is detected, the parameter update is issued.

Updates to time series typically arrive in small data increments. The writing process of our system receives an update for a time series in the form of one or more new data points in step S4. The writing process then computes the observed data frequency by counting the number of points in the last 15 minutes and dividing it by 15*60=900 to get the number of points per second measure. This measure is sent to the Statistics Collector in step S5.

The data frequency samples are stored per time series in the database by the Statistics Collector. Again, periodically the data frequency of the time series is checked. Computing the median value of the last day and comparing it to the stored current value for that time series. If the computed value differs by 50% from the stored current value, the parameter update is issued.

The parameter updates are received by the Block/Zone/Boundary Copy size algorithm in step S9. The algorithm keeps track of all the parameters (lag, time period length, data frequency, hardware parameters, . . . ). Whenever an update is received, it recomputes the optimal block, zone and boundary copy sizes. If the newly computed sizes differ from the current system setting, and there was no change in the last day, this is communicated to the writing process, the data block creator and last but not least the persisted, distributed compute platform that stores all the time series data (10). The system will only change the sizes if there was no change within the last day to avoid repartitioning the data too often.

When an update of the block size, zone size or boundary copy size is received by the persisted, distributed compute platform, the data has to be repartitioned according to the new size parameters.

If the boundary copy size is changed, this change either means removing copied blocks (decrease in size) or copying more data blocks (increase in size). The system merely has to keep track of which of the data blocks are copied and should still be copied. If the block is not copied yet, the data block creator cannot use that boundary copy key in a block key group. Hence, it uses the original block key, which means that a data block will need to be transferred over the network.

Changing the zone size also means that data has to be copied around. This will be done using the well-known blue-green scheme. The old zone scheme is considered blue, the new zone scheme is green. Data copying starts from the blue to the green zone scheme. The original data is kept as long as it is not fully represented in the new structure. That is, of data is not yet copied to the new zone, the old zone scheme is still used. Only if all blocks of an old zone are copied to the correct location, the old zone is removed. If all zones in the blue scheme are removed, the green scheme is accepted and becomes the new blue scheme.

Similarly, block size changes are handled by a blue-green scheme.

REFERENCE NUMERALS

100 Data partitioning system
110 Sensors
120 Storage Media
130 Processor
135 Local disk
140 Interface
150 Network

What is claimed is:

1. A method for redundant storage of time-series data in a distributed data storage system with a plurality of storage media, the method comprising:
    dividing the time-series data into a plurality of data blocks;
    storing the plurality of data blocks on ones of the plurality of storage media; and
    redundantly storing a subset of time series data, which is contiguous in time to one of the plurality of data blocks, on the same one of the plurality of storage media as the contiguous one of the plurality of data blocks.

2. The method of claim 1, wherein the data blocks are of the same size.

3. The method of claim 1, wherein the data blocks are collated into zones of a fixed time period, and wherein all of the data blocks of a single one of the zones are stored on the same one of the plurality of storage media.

4. The method of claim 1, wherein the time-series data is production data collected from a plurality of sensors.

5. The method of claim 1, further comprising dynamically changing the size of one or more of the data blocks or the zones based on at least one of executed queries or stored time-series data.

6. The method of claim 5, further comprising changing storage location of the time-series data after changing the size of at least one of the data blocks, the zones, or the subset of time series data.

7. The method of claim 1, further comprising adjusting the data partitioning and distribution of data over the cluster in response to parameters to optimize query answer time, wherein the parameters are the size of a block, the size of a zone, and the size of a boundary copy.

8. The method of claim 1, further comprising putting data blocks in zones, and co-locating data blocks and zones on time for operating on large time periods.

9. A method for accessing required time-series data from a distributed data storage system with a plurality of memory elements, wherein the time-series data is divided into a plurality of data blocks, the method comprising:
    executing a query requiring access to the time-series data;
    selecting the data blocks with the required time-series data and identifying the ones of the plurality of storage media on which the selected ones of the data blocks are stored; and
    accessing at least one of the identified ones of the plurality of storage media to retrieve the selected ones of the data blocks and also retrieve the time series data, which is contiguous in time, to the retrieved data block from the same one of the plurality of memory elements.

10. The method of claim 9, wherein the executing of the query further comprises dividing the query into a plurality of sub-queries for transmission to different ones of the plurality of storage media for selection of the required time-series data.

11. The method of claim 9, wherein the data blocks are collated into zones of a fixed time period, and wherein all of the data blocks of a single one of the zones are stored on the same one of the plurality of storage media.

12. The method of claim 9, further comprising dynamically changing the size of one or more of the data blocks, the subset of time series data, or the zones based on executed queries.

13. A database management system comprising:
    a plurality of storage media for storing time-series data in a plurality of data blocks;
    a processor connected to the plurality of storage media through a network; and
    a local storage medium connected to the processor, wherein the local storage medium stores at least one of the plurality of data blocks for accessing by the processor and redundantly stores a subset of time series data, which is contiguous in time to the stored one of the plurality of data blocks on the local storage medium.

14. The database management system of claim 13, further comprising a query executor for executing a query and transmitting sub-queries to different ones of the plurality of storage media in the network.

15. The database management system of claim 13, wherein the plurality of data blocks are collected as zones, the zones having a defined time length, and wherein all of the data blocks from a single one of the zones are stored on a single one of the plurality of storage media.

16. The database management system of claim 13, further comprising a statistics collector for processing statistics about data accessed by executed queries and adjusting the sizes of at least one of the data blocks, the subset of time series data, or the zones.

17. The database management system of claim 13, further comprising a statistics collector for processing statistics about newly stored time-series data and adjusting the sizes of at least one of the data blocks, the subset of time series data or the zones.

18. The database management system of claim 13, further comprising an auto-optimizing data partitioning system for adjusting the data partitioning and distribution of data over the cluster in response to parameters to optimize query answer time.

* * * * *